US008566919B2

(12) United States Patent
Meisel (10) Patent No.: US 8,566,919 B2
(45) Date of Patent: Oct. 22, 2013

(54) DISTRIBUTED WEB APPLICATION FIREWALL (75) Inventor: Alexander Meisel, Regensburg (DE)

(73) Assignee: Riverbed Technology, Inc., San Francisco, CA (US)

(*) Notice: Subject to any disclaimer, the term of this patent is extended or adjusted under 35 U.S.C. 154(b) by 849 days.

(21) Appl. No.: 12/280,760

(22) PCT Filed: Mar. 2, 2007

(86) PCT No.: PCT/EP2007/001820
§ 371 (c)(1),
(2), (4) Date: Oct. 24, 2008

(87) PCT Pub. No.: WO2007/098960
PCT Pub. Date: Sep. 7, 2007

(65) Prior Publication Data
US 2009/0328187 A1 Dec. 31, 2009

(30) Foreign Application Priority Data
Mar. 3, 2006 (DE) .................. 10 2006 009 992

(51) Int. Cl.
G06F 9/00 (2006.01)
G06F 15/16 (2006.01)
G06F 17/00 (2006.01)
G06F 15/173 (2006.01)

(52) U.S. Cl.
USPC ............. 726/13; 726/11; 726/12; 726/14; 709/223; 709/224; 709/225

(58) Field of Classification Search
USPC ................ 726/11–14; 709/223–225
See application file for complete search history.

(56) References Cited

U.S. PATENT DOCUMENTS 6,321,338 B1* 11/2001 Porras et al. ............. 726/25
7,617,170 B2* 11/2009 Chesla ..................... 706/46
(Continued)

FOREIGN PATENT DOCUMENTS

WO WO-2004/100486 A1 11/2004
WO WO-2005017813 A2 2/2005

OTHER PUBLICATIONS

P. Tonella et al., "Evaluation Methods for Web Application Clustering," Proceedings of the Fifth IEEE International Workshop on Web Site Evolution, 2003, 8 pages.*
(Continued)

Primary Examiner — Carl Colin
Assistant Examiner — John Elmore
(74) Attorney, Agent, or Firm — Park, Vaughan, Fleming & Dowler LLP (57) ABSTRACT A method for protecting a Web application running on a first local Web Server bases from hacker attacks, said Web Server being connectable to at least one client, the method comprising the following steps: —providing a plurality of preset rules on said Server, which correspond to specific characteristics of HTTP requests; —receiving an HTTP request on said server from the client, said HTTP request comprising a plurality of characteristics; —analyzing said characteristics of said received HTTP request in accordance with said rules provided on said server; —rejecting said HTTP request, if said rules identify said HTTP request as harmful request; —accepting said HTTP request, if said rules identify said HTTP request as trustable request; —classifying said HTTP request as doubtful request, if said rules identify said request neither as harmful request nor as trustable request; —evaluating the characteristics of said doubtful local request; —generating a learned rule on basis of the edge base evaluation.

19 Claims, 6 Drawing Sheets

(56) References Cited

U.S. PATENT DOCUMENTS

| | | | |
|---|---|---|---|
| 8,346,848 B2* | 1/2013 | Peiffer et al. | 709/203 |
| 2003/0051026 A1 | 3/2003 | Carter et al. | |
| 2003/0226038 A1 | 12/2003 | Raanan et al. | |
| 2004/0123141 A1* | 6/2004 | Yadav | 713/201 |
| 2008/0201278 A1* | 8/2008 | Muller et al. | 706/12 |

OTHER PUBLICATIONS

Endler, D., "Brute Force Exploitation of Web Application Session IDs," iDefense Inc., 2001, 40 pages.*

"International Application Serial No. PCT/EP2007/001820, Written Opinion mailed Jul. 19, 2007", 2 pgs.

"RFC 822—Standard for the Format of ARPA Internet Text Messages", (Revised by David H. Crocker, Dept. of Electrical Engineering, University of Delaware, Newark, DE). [online]. Retrieved from the Internet: <URL: http://asg.web.cmu.edu/rfc/rfc822.html>, (Aug. 13, 1982), 50 pgs.

Fielding, R., et al., "RFC 2616—Hypertext Transfer Protocol—HTTP/1.1", © 1999 The Internet Society. [online]. [retrieved Dec. 28, 2004]. Retrieved from the Internet: <URL: http://www.faqs.org/rfcs/rfcs/rfc2616.html>, (1999), 133 pgs.

International Application Serial No. PCT/EP2007/001820, International Search Report mailed Jul. 19, 2007, 3 pgs.

"Israeli Application Serial No. 193756, Office Action mailed Jan. 2, 2012", 5 pgs.

"Israeli Application Serial No. 193756, Voluntary Amendments filed N/A", 26 pgs.

* cited by examiner

DISTRIBUTED WEB APPLICATION FIREWALL

RELATED APPLICATIONS

This application is a nationalization under 35 U.S.C. 371 of PCT/EP2007/001820, filed Mar. 2, 2007 and published as WO 2007/098960 A1, on Sep. 7, 2007, which claimed priority under 35 U.S.C. 119 to German Patent Application Serial No. 10 2006 009 992.3, filed Mar. 3, 2006; which applications and publication are incorporated herein by reference and made a part hereof.

BACKGROUND OF THE INVENTION

1. Technical Field of the Invention

The present invention relates in general to Web application security. The invention provides a mean to protect a Web application from hacker attacks. Thus the present invention is a Web Application Firewall (WAF). The invention makes use of several Artificial Intelligence (AI) techniques.

2. Description of the Related Art

HyperText Transfer Protocol

HyperText Transfer Protocol (HTTP) is the primary method used to convey information on the World Wide Web (WWW). The original purpose was to provide a way to publish and receive HyperText Markup Language (HTML) pages. HTML is a markup language designed for the creation of web pages and other information viewable in a browser.

Development of HTTP was coordinated by the World Wide Web Consortium and working groups of the Internet Engineering Task Force, culminating in the publication of a series of RFCs, most notably RFC 2616, which defines HTTP/1.1, the version of HTTP in common use today.

Like most network protocols, HTTP uses the client-server model; An HTTP client, such as a web browser, typically initiates a request by establishing a TCP connection and sending a request message to a particular port on a remote server. The server then returns a response message, usually containing the resource that was requested. After delivering the response, the server closes the connection (making HTTP a stateless protocol, i.e. not maintaining any connection information between transactions). In that point, HTTP differs from other TCP-based protocols such as FTP. This design makes HTTP ideal for the World Wide Web, where pages regularly link to pages on other servers. It can occasionally pose problems, as the lack of a persistent connection necessitates alternative methods of maintaining users' "state". Many of these methods involve the use of "cookies", but this is often not sufficient from a security point of view.

HTTP Cookie

An HTTP cookie (usually called simply a cookie) is a packet of information sent by a server to a WWW browser and then sent back by the browser each time it accesses that server. Cookies can contain any arbitrary information the server chooses and are used to maintain state between otherwise stateless HTTP transactions. Typically this is used to authenticate or identify a registered user of a web site as part of their first login process or initial site registration without requiring them to sign in every time they access that site.

Structure of HTTP Transactions

The format of the request and the format of response messages are similar, and English-oriented. Both kinds of messages consist of:

An initial line (different for request vs. response);
Zero or more header lines;
A blank line (i.e. a CRLF by itself);
An optional message body (e.g. a file, or query data, or query output).

Initial Request Line

The initial line is different for the request than for the response. A request line has three parts, separated by spaces: A method name, the local path of the requested resource, and the version of HTTP being used. A typical request line is:

GET/path/to/file/index.html HTTP/1.1

The path is the part of the URL after the host name, also called the request URI (a URI is like a URL, but more general). The most common HTTP request methods are:

GET is by far the most common HTTP method, for statically requesting a resource by specifying a URL. It says "give me this resource"

POST Similar to GET, except that a message body, typically containing key-value pairs from an HTML form submission, is included in the request;

PUT Used for uploading files to a specified URI on a webserver;

HEAD Identical to GET, except that the page content is not returned; just the headers are. Useful for retrieving meta-information.

Initial Response Line

The initial response line, called the status line, also has three parts separated by spaces: the HTTP version, a response status code that gives the result of the request, and an English reason phrase describing the status code. Typical status lines are:

HTTP/1.1 200 OK or

HTTP/1.1 404 Not Found

The status code is meant to be computer-readable; the reason phrase is meant to be human-readable, and may vary. The status code is a three-digit integer, and the first digit identifies the general category of response. The most common status codes are:

200 OK The request succeeded, and the resulting resource (e.g. file or script output) is returned in the message body;

404 Not Found The requested resource doesn't exist;

302 Moved Temporarily redirects the client to another URL;

500 Server Error An unexpected server error. The most common cause is a server-side script that has bad syntax, fails, or otherwise cannot run correctly.

Header Lines

Header lines provide information about the request or response, or about the object sent in the message body.

The header lines are in the usual text header format, which is: one line per header, of the form "Header-Name: value", ending with CRLF. The format is defined in RFC 822, section 3 (same format as for email and news postings). HTTP 1.0 defines 16 headers, though none are required. HTTP 1.1 defines 46 headers, and one (Host:) is required in requests. For Net-politeness, the following headers are often included in requests:

From This header gives the email address of whoever's making the request, or running the program doing so (user-configurable, for privacy concerns);

User-Agent This header identifies the program that is making the request, in the form "Program-name/x.xx", where x.xx is the (mostly) alphanumeric version of the program.

Referer This header contains the URL of the document from which the request originated.

The following headers are often included in responses:

Server This header is analogous to the User-Agent: header: it identifies the server software in the form "Program-name/x.xx". For example, one beta version of Apache's server returns "Server: Apache/1.3b3-dev";

Last-Modified This header gives the modification date of the resource that's being returned. Used in caching and other bandwidth-saving activities.

The Message Body

An HTTP message may have a body of data sent after the header lines. In a response, this is where the requested resource is returned to the client (the most common use of the message body), or perhaps explanatory text if there's an error. In a request, this is where user-entered data or uploaded files are sent to the server.

If an HTTP message includes a body, there are usually header lines in the message that describe the body. In particular:

Content-Type This header gives the MIME-type of the data in the body, such as text/html or image/gif;

Content-Length This header gives the number of bytes in the body.

Secure HTTP

HTTPS is the secure version of HTTP, using SSL/TLS to protect the traffic. The protocol normally uses TCP port 443. SSL, originally created to protect HTTP, is especially suited for HTTP since it can provide (some) protection even if only one side to the communication, the server, is authenticated.

Man in the Middle Attack

A man in the middle attack (MITM) is an attack in which an attacker is able to read, insert and modify at will, messages between two parties without either party knowing that the link between them has been compromised. Even with the use of HTTPS, an attacker may be able to observe and intercept messages going between the two victims. In particular, this will be the case if the attacker is able to fool the client (e.g. victim's browser) into connecting to him rather than the requested server. The attacker then connects to the server on behalf of the victim, and effectively sits between the communicating parties, passing messages back and forth. He plays the role of the server on one side, and the client on the other.

Phishing Attack

Phishing is the act of attempting to fraudulently acquire sensitive information (e.g. credit card numbers, account usernames, passwords, social security numbers) by masquerading as a trustworthy person or company. Phishing attacks use both social engineering and technical subterfuge. Social-engineering schemes use spoofed e-mails to lead consumers to counterfeit websites designed to trick recipients into divulging sensitive information (i.e. the victim thinks to be connected to a trustworthy server). Hijacking brand names of banks, e-retailers and credit card companies, phishers often convince recipients to connect to their counterfeit websites. The following techniques are often used to hijack original brand names: Use of the "@" symbol in a URL, for example http://www.mybank.com@members.attacker.com/. Even if the first part of the link looks legitimate, this address will attempt to connect as a user www.mybank.com to the server members.attacker.com. The same is true for misspelled URLs or sub-domains, for example http://www.mybank.com.attacker.net Technical subterfuge schemes typically use DNS spoofing to misdirect users to fraudulent sites or proxy servers.

SUMMARY OF THE INVENTION

The present invention relates in general to Web application security. The invention provides a mean to protect a Web application from hacker attacks. Thus the present invention is a Web Application Firewall (WAF).

In particular, the invention is defined in independent method claim 1 and in independent system claim 9.

Specific embodiments of the invention are defined in dependent claims 2 to 8 and 19 to 15.

The role of the invention is to analyse each HTTP request and to protect against misuse of the Web server (e.g. injection flaws, cross site scripting, phishing, . . . ).

The invention uses a set of rules combined with learning and Artificial Intelligence (AI) algorithms to make decisions. The invention can acquire knowledge about the attacks (e.g. by learning).

The various instances of the invention are connected via a central server. Thus, the invention has a distributed architecture to enable a collaborative use of the information learned.

Roughly, the functioning of the invention is the following:

A set of initial customizable rules (Handlers) allows the user to protect his Web application against common attacks;

The choice of the rules and of their parameters provides a mean to inject initial knowledge in the learning process: some HTTP requests will be blocked according to the rules; a learning algorithm then learns by observing denied requests.

The invention can block harmful requests by doing inference using its experience. Doing so, it can block requests even if they do not match one of the existing fixed rules.

Several instances of the invention can share the knowledge they acquired in order to improve the recognition of attacks.

One (or several) central server allows various instances of the invention to communicate. This (those) server(s) is (are) in charge to decide which knowledge is relevant for which instance of the invention.

DESCRIPTION OF THE DRAWINGS

100 is a global server (GIS), containing various knowledge bases (Expert knowledge database—EKD—402 and Learned knowledge database—LKD—403). Those knowledge bases contain attack descriptions and are uploaded to the WAF/Plugins 103 in order to facilitate attack recognition.

101 is a knowledge database containing attacks descriptions. This knowledge could be used by various WAF/Plugins.

102 is the network connecting the various WAF/Plugins between each other (through the global server). The clients also access the Web applications 107 located on Web servers 106 through this network (typically internet).

103 is an instance of the invention: a WAF, implemented as a Web server Plugin.

104 is a knowledge database containing attacks descriptions. This knowledge is specific to the WAF/Plugin 103.

105 are HTTP clients (typically Web browsers).

106 is the Web server hosting the Web application 107 protected by the invention.

107 is the Web application protected by the invention.

200 is a global server (GIS), containing various knowledge bases 204, 205, 206 (Expert knowledge database—EKD—402 and Learned knowledge database—LKD—403). Those knowledge bases contain attack descriptions and are uploaded to the WAF/Plugins 203 in order to facilitate attack recognition. The GIS also contains Web applications profiles 201 to compare the various Web application protected by the WAFs and to decide which Plugin requires which knowledge.

201 is the Web application profiles databases. This database is generated by using Clustering algorithms to compare the various Web applications and to generate classes (in order to know which Web applications are similar to share the knowledge).

202 is the network connecting the various WAF/Plugins between each other (through the global server). The clients also access the Web applications 107 located on Web servers 106 through this network (typically internet).

203 is an instance of the invention: a WAF, implemented as a Web server Plugin.

204 is a knowledge database containing attacks descriptions. This knowledge could be used by various WAF/Plugins 207.

205 is a knowledge database containing attacks descriptions. This knowledge could be used by various WAF/Plugins 208.

206 is a knowledge database containing attacks descriptions. This knowledge could be used by various WAF/Plugins 209.

207 is a Web server (WS) and a Web application (WA) protected by an instance of the WAF/Plugin 203 using the knowledge base 204.

208 is a Web server (WS) and a Web application (WA) protected by an instance of the WAF/Plugin 203 using the knowledge base 205.

209 is a Web server (WS) and a Web application (WA) protected by an instance of the WAF/Plugin 203 using the knowledge base 206.

301 is a network connection between a Global Intelligence Server (GIS) and a local Plugin (WAF/LAI). This link is used to update the knowledge databases from the Local Plugins as well as to upload new discovered knowledge from a Plugin to a GIS. The new knowledge can be then potentially used by other Plugins protecting similar Web applications.

302 is a global server (GIS), containing various knowledge bases 204, 205, 206 (Expert knowledge database—EKD—402 and Learned knowledge database—LKD—403). Those knowledge bases contain attack descriptions and are uploaded to the WAF/Plugins 203 in order to facilitate attack recognition. The GIS also contains Web applications profiles 201 to compare the various Web application protected by the WAFs and to decide which Plugin requires which knowledge.

303 is the Local Artificial Intelligence engine (LAI). This is a part of the WAF/Plugin which is dedicated to provide autonomy to the WAF. Automatic reasoning is achieved by using various Artificial Intelligence (AI) algorithms. An example is the use of Bayesian learning algorithm in the Learn URL Handler.

304 is a network connection between two Global Intelligence Server (GIS). This link is used to update the knowledge databases from one GIS to another.

305 is the Web server hosting the Web application protected by the invention.

401 is a global server (GIS), containing various knowledge bases (Expert knowledge database—EKD—402 and Learned knowledge database—LKD—403). Those knowledge bases contain attack descriptions and are uploaded to the WAF/Plugins/LAI 407 in order to facilitate attack recognition. The GIS also contains Web applications profiles 201 to compare the various Web applications protected by the WAFs and to decide which Plugin requires which knowledge.

402 is the Expert knowledge database (EKD), a database containing attack descriptions. This knowledge is manually inserted by experts (e.g. by defining new Handlers). This knowledge can be used by the local Plugins to detect new attacks 404. In particular this knowledge serves as initial knowledge base for AI based Handlers which need supervised learning.

403 is the Learned knowledge database (LKD), a database containing attacks descriptions. When the Artificial Intelligence Engine of a local Plugin 407 learns new results concerning an attack 405, this knowledge is uploaded 409 to the GIS 401. The others plugins—if they protect similar Web applications—can then use this knowledge 408, 409, 410.

404 is a local Expert knowledge database (EKD) for a particular WAF/Plugin/LAI.

405 is a local Learned knowledge database (LKD) for a particular WAF/Plugin/LAI.

406 is the Web server hosting the Web application 107 protected by the invention.

407 is the Local Artificial Intelligence engine (LAI). This is a part of the WAF/Plugin which is dedicated to provide autonomy to the WAF. Automatic reasoning is achieved by using various Artificial Intelligence (AI) algorithms. An example is the use of Bayesian learning algorithm in the Learn URL Handler.

408 is a network connection between a Global Intelligence Server (GIS) and a local Plugin (WAF/LAI). This link is used to update the knowledge databases (LKD and EKD) from the Local Plugins as well as to upload new discovered knowledge from a Plugin to a GIS. The new knowledge can be then potentially used by other Plugins protecting similar Web applications 410.

409 is a network connection between two local Plugins (WAF/LAI) through a Global Intelligence Server (GIS). The various local Plugins and their Local Artificial Intelligence engines (e.g. LAI 1 and LAI 2 on FIG. 4) can then share their acquired knowledge (LKD 405)

410 is a network connection between a Global Intelligence Server (GIS) and a local Plugin (WAF/LAI).

FIG. 5 is a diagram illustrating the location of a Web application firewall in a network infrastructure. The WAF is normally located in the DMZ (demilitarized zone). A DMZ is a network area that sits between an organization's internal network and an external network, usually the Internet. Typically, the DMZ contains devices accessible to Internet traffic, such as Web servers. Thus the WAF protects the Web applications and the Web Servers from misuse. The potential attackers normally do not have a direct access to the internal application/database servers. Each incoming and outgoing HTTP request/response transits through the WAF to prevent potential attackers from accessing organization's internal network and resources.

DETAILED DESCRIPTION OF THE INVENTION

The method according to an embodiment will be described by way of non-limiting example only, with reference to the accompanying drawings, wherein the same reference numbers denote the same elements.

Local Web Server Plugin

The invention provides a mean to analyse the HTTP traffic between one or several clients 105 and a Web Server (WS) 106, 305, 406. Therefore, the invention works as a filter between the clients and the Web server. The classical client for a Web server is a Web browser, but attackers could possibly use other means than a Web browser to send requests to the Web server. Thus we call client a user who send request to the web server.

A possible implementation of the invention is a Web server Plugin 103, 203, 303, 407. In this configuration, the HTTP request first transits through the Plugin, and could potentially be modified before being forwarded to the Web server. The invention can also decide not to forward the request to the Web server if it judges that the request is/could be dangerous. The invention can also keep track of the requests in order to furnish enhanced logging information or to achieve some learning 104, 204, 205, 206, 207, 404. The invention can also trigger alarms, or send email to an administrator if it judges it necessary. The invention can also analyse the outgoing responses from the server to a client (analyse of the outgoing HTTP traffic).

Figure 6:
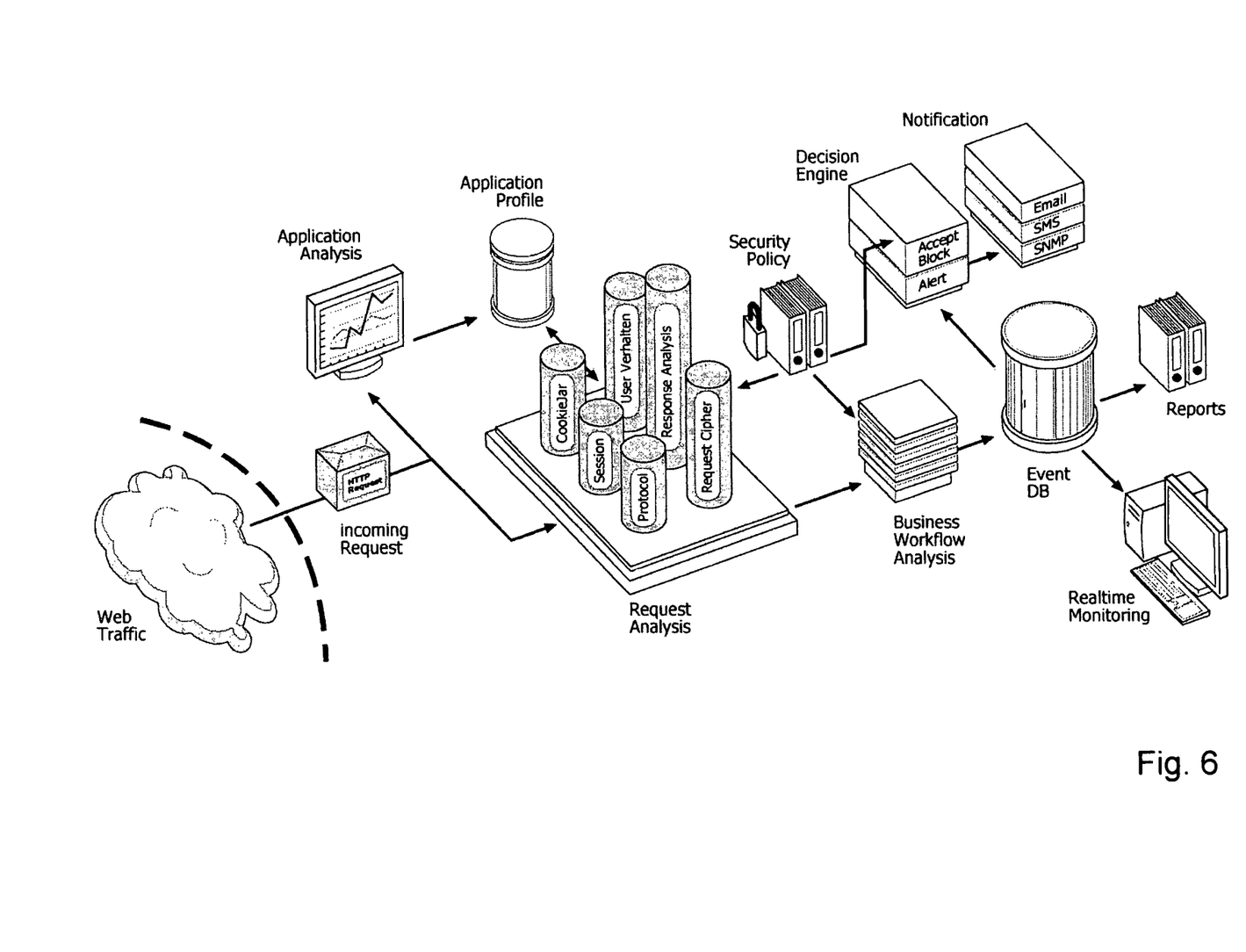
FIG. 6 is a diagram illustrating the functioning of the invention (standalone version, without the inter-connexion through a global server—GIS).

So the basic functioning of the invention is:
- analyse the incoming/outgoing HTTP requests/responses;
- potentially modify the requests/responses;
- forward the requests (potentially modified) to the Web server;
- block a request if it is considered as harmful;
- keep track of various information about the HTTP transfer (logging, learning) 104, 204, 205, 206, 207, 404;
- communicate with other instances of the invention to have an up-to-date knowledge of existing attacks (use of a global server 101, 200, 302, 401 to enable the communication between several instances of the invention 301). Please see section distributed architecture;
- trigger alarms/send emails (see FIG. 6: notification, reports, monitoring).

Handlers

A set of rules allows describing the behaviour of the Plugin and the way how the request should be handled. In the current implementation of the invention we call such rules Handlers (see FIG. 6: request analysis). One possible implementation of the Handlers is the following: Each Handler has a set of parameters so the administrator of a Web application can tune it to fit its own Web application (by modifying the Handlers configuration). The handlers are designed to face the most current existing attacks against Web applications. As a very common problem of Web applications is their poor design (from a security point of view), the handlers are mostly designed to counterbalance the common weaknesses of Web applications.

For example, it is common that Web applications secure users' sessions with cookies. Each cookie contain an identifier (ID) assigned to the session. If the IDs are not chosen properly, an attacker can predict or guess the ID of someone else's session and thus hijack the session. This would be the case if the IDs were—for example—increasing integers. If the attacker logs itself with the session-ID X, it is very simple to predict that the next client will have the session-ID X+1. Stealing a user's session would then be very simple. To counter this common weakness of existing Web applications, the invention includes a Handler which secures the sessions with strong session-IDs. The HTTP requests and responses are then modified by the Plugin to contain a cookie generated by the Handler. This Handler is called Cookie Jar Handler. The Cookie Jar Handler allows securing sessions with a strong authentication mechanism. Here are other implementation examples of various Handlers:

Check User Agent Handler: The Check User Agent Handler examines the HTTP User Agent Header sent by the client (in the normal case, a Web browser) for validity. This test is achieved by using a Blacklist and a Whitelist. This Handler allows distinguishing real Web browsers from simple scripts. The HTTP requests containing a User Agent matching one of the Blacklist as well as requests containing a User Agent outside of the Whitelist are rejected with an error code.

Cookie Jar Handler: This Handler modifies the HTTP responses from the Web server to the client so they do not contain the original Cookies from the Web application anymore. The session management is then achieved by the Session Handler. The original Cookies are stored locally by the Plugin and are transmitted to the Web server, so this process does not affect the Web application which is not aware that the Cookies are not really transmitted to the client. The client does not have direct access to the Cookies of the Web application, and is therefore unable to affect them. The only Cookies seen by the client are the one set by the Cookie Jar Handler. Those Cookies only contains a secure token. A token is typically a digital signature such as a cryptographic hash of client unique identifiers (such as IP address and browser version) encrypted with a secret key stored locally by the invention (not accessible to attackers to counterfeit a Cookie).

Deny Handler: When this Handler is activated, the requested URLs matching a given regular expression (regex), will lead to an HTTP Error-Code 403 (Forbidden). For example, used with the following regex "/.*\.cgi" this Handler will deny the access to all CGI scripts from a Web site.

Entry Point Handler: This Handler enforces the client to enter into the protected Website only by using one of a set of predefined URLs (e.g. the login page, or the main page).

Hide Basic Auth Handler: It is often the case that Web applications are password protected by using HTTP BasicAuth. (e.g. by using the .htaccess file from the Apache Webserver). BasicAuth is an authentication protocol supported by most browsers in which a Web server authenticates an entity with an encoded user name and password passed via data transmissions. HTTP BasicAuth is normally very simple to use. However HTTP BasicAuth has also some serious disadvantages:

- The Login page is not configurable, only a dialogue box is displayed by the Web browser. The Login page cannot be adapted to a Corporate Identity; a Disclaimer, further information or assistance cannot be inserted into the Login page.
- When using BasicAuth, it is not possible to logout. In order to enforce a logout, the Web browser has to be closed by the user.

The Hide Basic Auth Handler offers a possibility of using a form-based Login/Logout without having to modify neither the configuration of the Web application nor the configuration of the Web server. The Hide basic Auth Handler makes an HTTP-BasicAuth based authentication looks like a session-based authentication. The Hide basic Auth Handler combines the advantages of both login methods.

Invalid Args Handler: This Handler works in a same manner as the InvalidArgsHandler: the keys and corresponding values present in the parameters are checked aGISnst a "valid-key-pattern" regex and an "invalid-key-pattern" regex (resp. "valid-key-value-pattern" and "invalid-key-value-pattern" regexes).

Invalid URL Handler: This Handler analyse the URL (without the parameters after the '?'). A URL is valid if it matches a least one the of the "valid-pattern" regex and none of the "invalid-pattern" regex.

Limit Request Per Second Handler: The Limit Request Per Second Handler restricts the maximal number of processed HTTP requests per time unit. If the permitted contingent of requests is exceeded, the invention rejects further Requests with the error code 503 (service Unavailable), until another time unit is available.

Redirect Handler: The Redirect Handler allows dynamically producing an HTTP Redirect Response as reply to an HTTP Request. If a Request matches a given pattern, the invention replaces the pattern by a given character string. It is possible to use regular expressions (regex) to define the patterns.

Referer Handler: This Handler inspect inspects the field "Referer" in the HTTP Header of incoming requests. This Handler handles three referer lists:
  whitelist: list of authorized referers;
  blacklist: list of forbidden referers;
  graylist: when a referer is not present in the whitelist or in the blacklist, then the "graylist" is used to temporally store this referer. When it does happen that a same referer has been detected more than "threshold counter" in a time window from "threshold_timedelta" seconds, then the following request with the same referer will lead to a redirection to a "graylisturl" (an URL chosen by the user of the invention).

This Handler can be part of a security policy aGISnst Phishing or "deep linking". It prevents a part of the protected Website to be linked (at least too often) from another Website. Thus, if a Phishing Website has a lot of links to the protected Website, the Phishing Website will be quickly discovered by the invention.

Required Header Field Handler: By using this Handler, it is possible to specify a list of HTTP Headers, which have to be present in each HTTP Request (otherwise the Request is rejected). A typical use of this Handler is to differentiate between simple scripts from real Web browsers.

If one or several of the required headers are missing, the invention rejects the Request with the error code 403 (Forbidden).

robots.txt Handler: A robots.txt file specifies which directories are allowed to be visited by Web Robots (also known as a Web spiders, or Web crawlers) and which directories are not allowed to be visited. Most search engines read the instructions of robots.txt files, but there is no warranty that malicious scripts (programmed by attackers) will respect those instructions.

The robots.txt Handler produces a virtual robots.txt file by using the User Agent field (from the HTTP request header). This file is then provided when URL/robots.txt is requested.

Secure Connection Handler: This Handler prevents attacks on the SSL (Secure Sockets Layer) stack in the Web server (e.g. in the Apache Web Server, Null-Encryption is switched on by default for debugging purposes). If the characteristics of the encryption given in the Handler configuration are not fulfilled, the Request will then be rejected (with an error code also specified in the Handler configuration).

Session Handler: When this Handler is activated, a secure session between the Web server the client is established. The SessionID is stored in a Cookie.

Sticky Form Handler: The Sticky Form Handler guarantees that a potential attacker does not change variables values in a form. The examination begins with the first Request and ends with the end of the session. If the value of a variable changes during this time, the invention redirects the client to an error page.

Valid Client IP Handler: The Valid Client EP Handler validates the IP address of the inquiring clients (e.g. Web browsers) by using a list of valid IP address ranges. If the IP address is not valid, the request is rejected.

This Handler can be used in order to limit the access to certain virtual hosts or URL prefixes (a part from a Web site) that can be accessed only by users from a particular computer network (for example a given company).

Valid HTTP Method Handler: The Valid HTTP Method Handler bounds the allowed HTTP methods for a Request. By using this Handler, the user of the invention can indicate for each supported HTTP methods whether it is allowed or not.

Valid Request Handler: This Handler tests the validity of the request, and verifies that each request is conform to HTTP standards.

Local Artificial Intelligence Engine (LAI)

To enable a certain amount of autonomy, the invention is capable of automatic reasoning in order to decide whether a request should be denied or not 303, 407. The methods employed to achieve this autonomous reasoning rely on Artificial Intelligence (AI) algorithms.

Thus, some Handlers can make use of Artificial Intelligence methods. For example the Learn URL Handler can learn from other Handlers: by observing, which requests are denied and which ones are valid, this Handler acquires knowledge. Based on what the Learn URL Handler has learnt, it can make autonomous decision. This Handler works by using a Bayesian learning algorithm. The initial knowledge needed by this learning algorithm is given by:
  Security experts who give a description of known attacks (expert knowledge);
  The user of the invention, who can tune the invention to fit his security needs in regard to his Web application.

A possible implementation of a way to inject this initial knowledge in the learning process is the following:
  The expert knowledge is included in the Handlers: by choosing and designing the Handlers, the experts have a way to include knowledge in the invention;
  The user can control the parameters of each Handler, which is a way to include knowledge.

The AI-based Handlers can acquire knowledge (e.g. statistic databases about how harmful are certain key/value combinations in URL) and store this knowledge locally 104, 204, 205, 206, 404. This knowledge can be reused for subsequent request analysis, thus improving the recognition of attacks.

Distributed Architecture

The instances of the invention (Plugins) are interconnected, using one (or several) central server(s) 101, 200, 302, 401. Thus, the invention has a distributed architecture. The various Plugins form a network 202. Each local Plugin can reason and make decisions thanks to the Local Artificial Intelligence (LAI) 303, 407 and the local Handlers (FIG. 6: Request analysis). At a higher level, the LAIs can communicate with one (or several) server(s) 101, 200, 302, 401 to transmit relevant information. In particular, if a LAI detects and learns a previously unknown attack, this new knowledge will be shared with the server(s) 408, 410, which will in turn share this knowledge with others LAIs 409. The server is also capable of reasoning, and is therefore called Global Intelligence Server (GIS) 302, 401. One of the main difficulties that the GIS have to handle is to decide which information 204, 205, 206 is relevant for which LAI/WAF 203, 207, 209. In other terms, if a LAI discovers a new attack and propagates 301, 408, 409 this knowledge to GIS, the GIS have to choose for which other LAIs this new information is relevant. The rule is the following: if two Web Applications protected by two LAI are similar, then the knowledge acquired by one LAI is relevant to the other. The big question is how to decide whether two applications are similar and if they should share their knowledge. This is the role of GIS to handle this problem, with the use of Clustering methods. Thanks to those methods, GIS builds a database containing the various profiles of the Web applications protected by the invention 201. If two local Plugins protect two Web applications having the same profile, then the acquired knowledge 403 can be shared to improve attack recognition.

Global Intelligence Sever (GIS)

Each instance of the invention (client) can connect to a Global Intelligence Server 302, 401. Several GIS are spread around the world. GIS are also connected together 304. Each GIS has several tasks:

Product Update

Deliver the latest version of the invention to the client (depending on his licence).

Data Abstraction

The GIS collects information from the local plugins (WAF/LAI) 103, 203, 303, 406, 407. Sensible information (password, credit card number . . . ) will not circulate through the network 202. Only data abstractions will be submitted from local plugins to the GISs 101, 200, 302, 401.

Global Reasoning

The GIS is capable of reasoning. It uses the data uploaded by the local plugins to analyze sessions (using various AI algorithms: e.g. Plan recognition; Clickstream analysis; Learning). The algorithms employed here can deliver an asynchronous result and therefore have more time to achieve more complex analysis than local plugins (which should not slow down the Web server). The algorithms employed on the GIS to analyse the traffic and the session may be complicated known algorithms.

Expert Knowledge Database (EKD)

Figure 1:
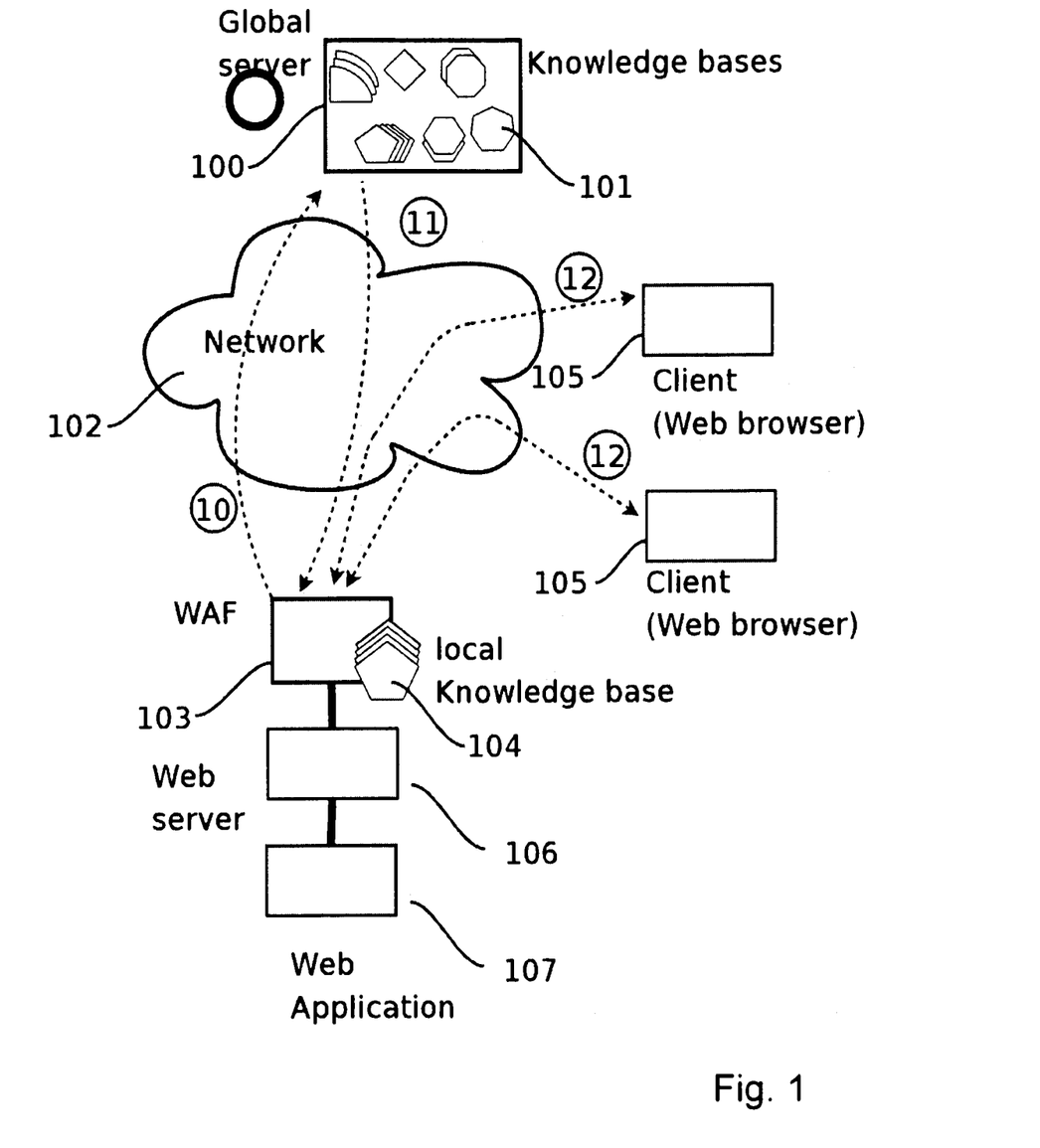
FIG. 1 is a diagram illustrating the inter-connexions between an instance of the invention (i.e. a Web application firewall—WAF—, 103), a global server (100) and some HTTP clients (105)
Figure 2:
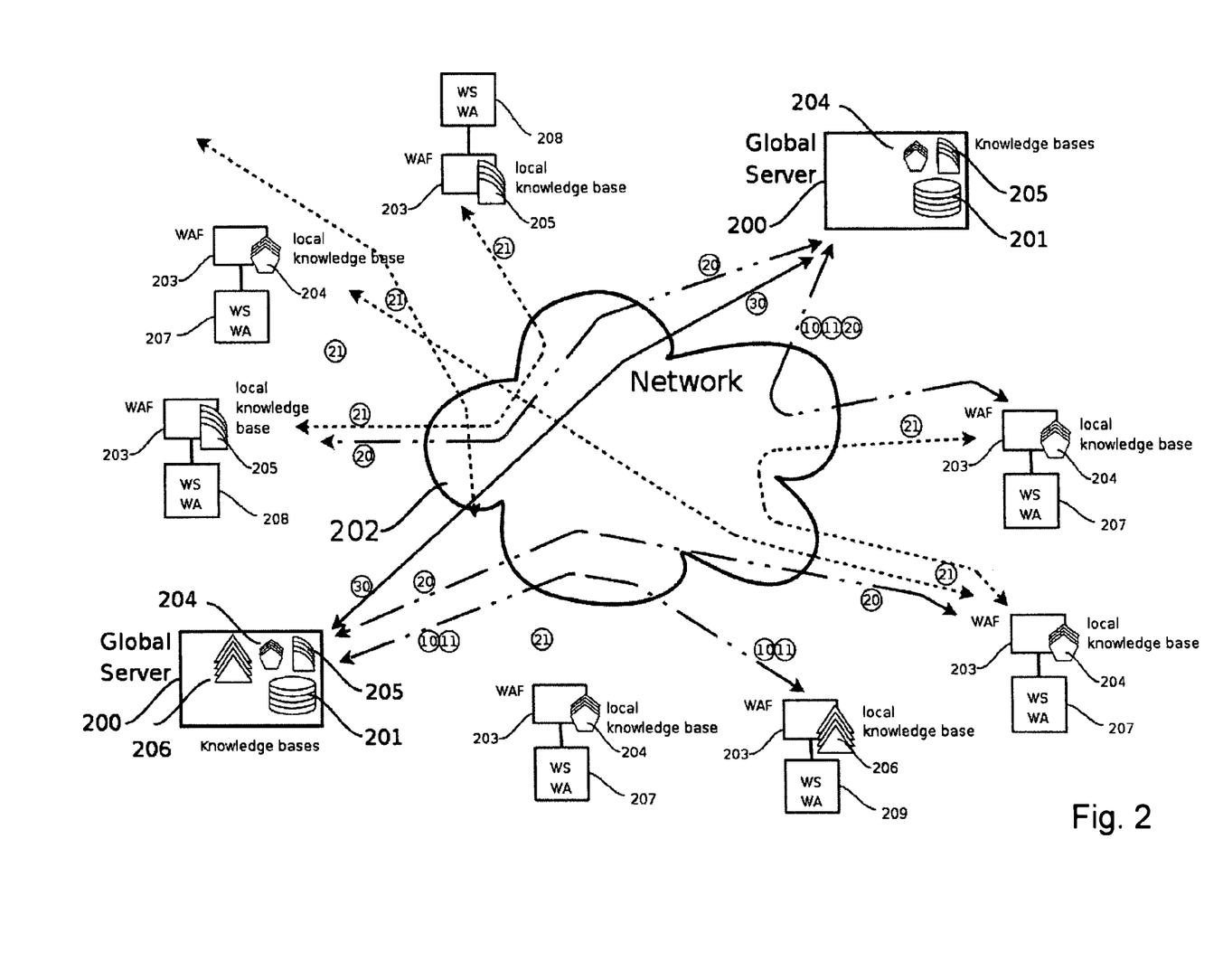
FIG. 2 is a diagram illustrating the inter-connexions between several instances of the invention (WAFs, 203) and two global servers (200)
Figure 3:
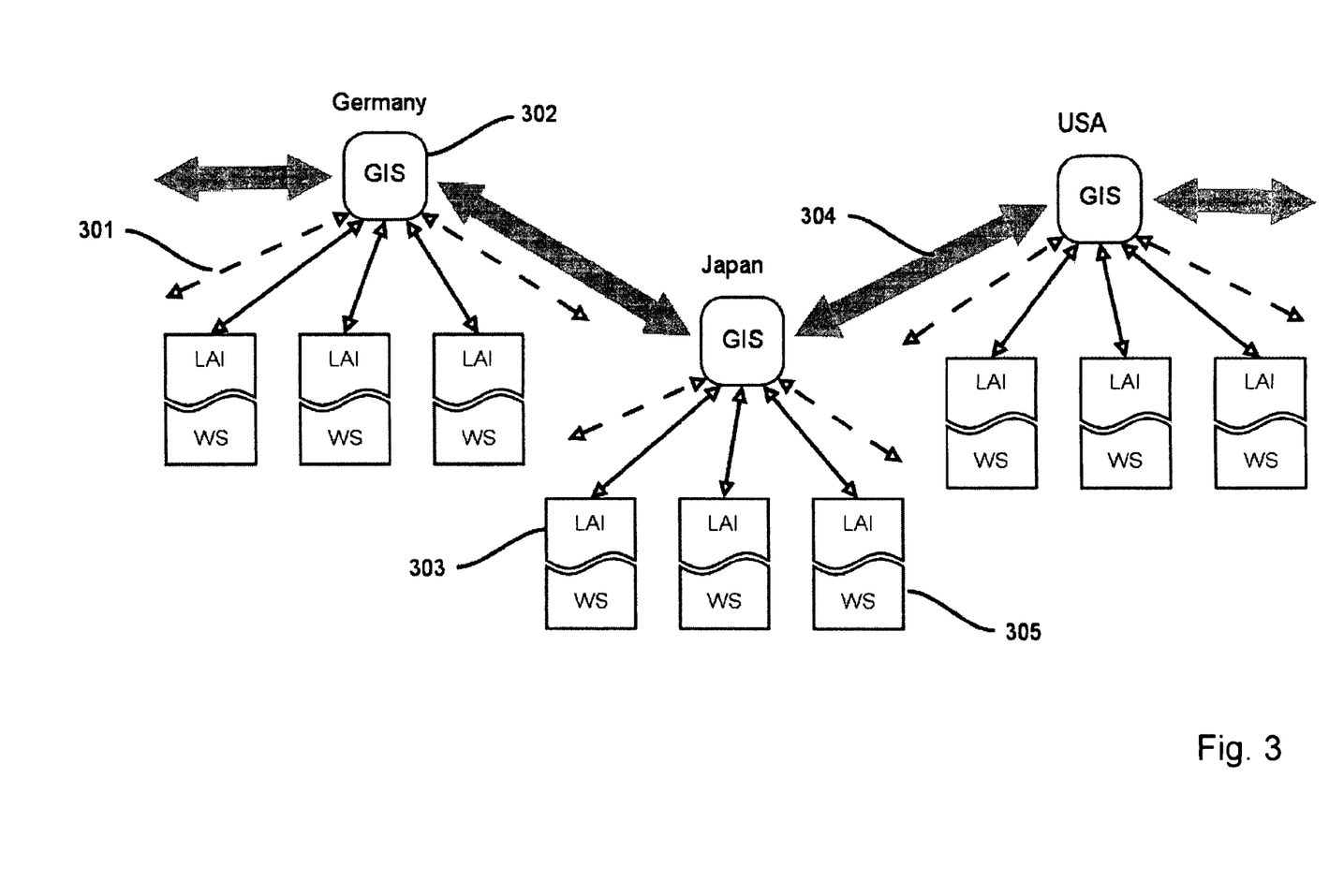
FIG. 3 shows the global architecture of the invention: several WAFs are connected together using several global servers (GIS) which are spread around the world. Each local instance of the invention uses an Artificial Intelligence Engine (LAI) to protect a Web application running on a Web Server (WS).
Figure 4:
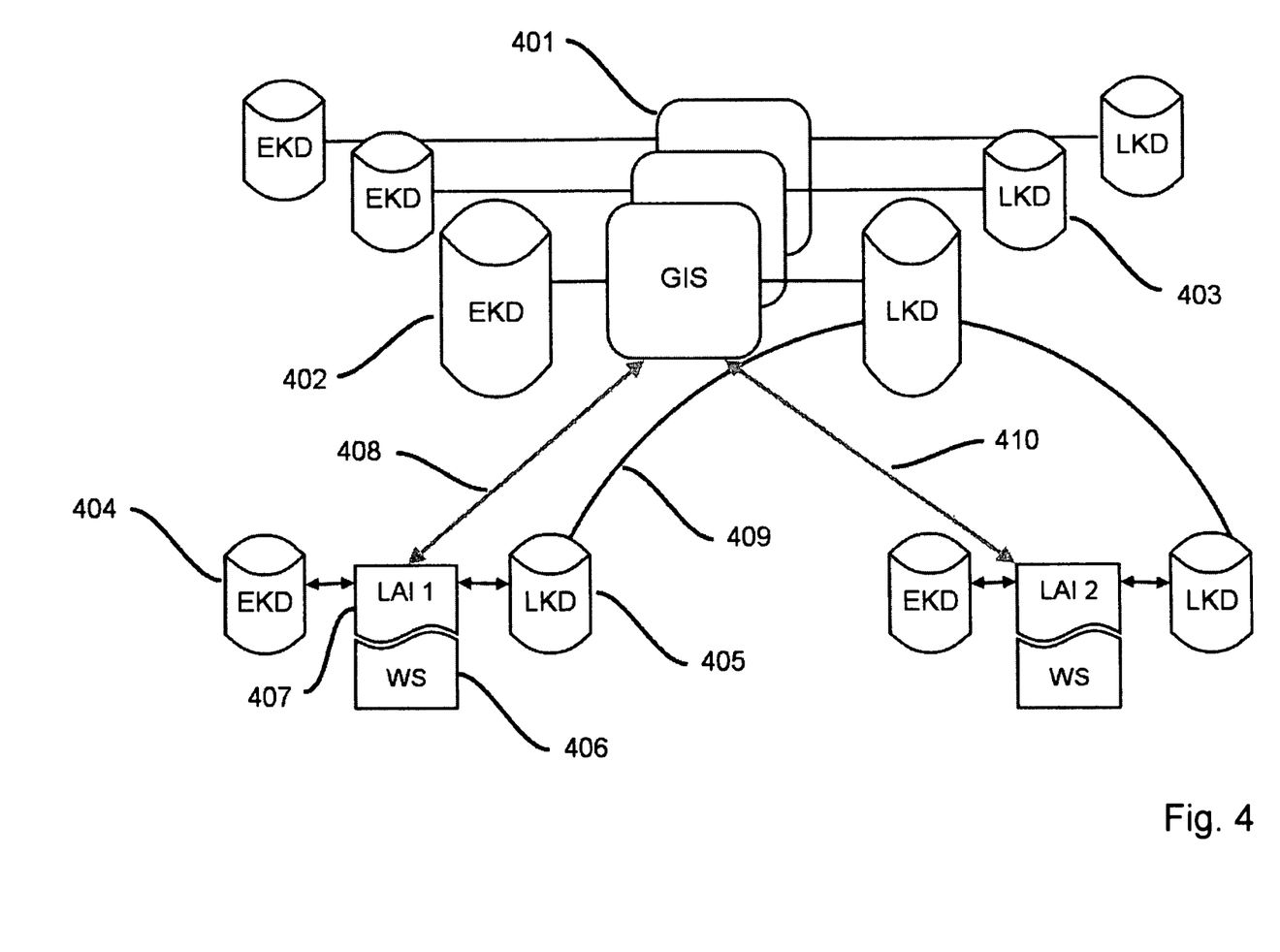
FIG. 4 shows a Global Intelligence Server (GIS) connected to two local instances of the invention. Each instance of the invention has a Local Artificial Intelligence engine (LAI 1 and LAI 2). Each LAI can use Expert knowledge database (EKD) to protect WS/WA against known attacks and can discover and learn new attacks. The description of the new attacks is stored in Learned knowledge database (LKD). By using the GIS, the LAI can share their EKD and LKD.
Figure 5:
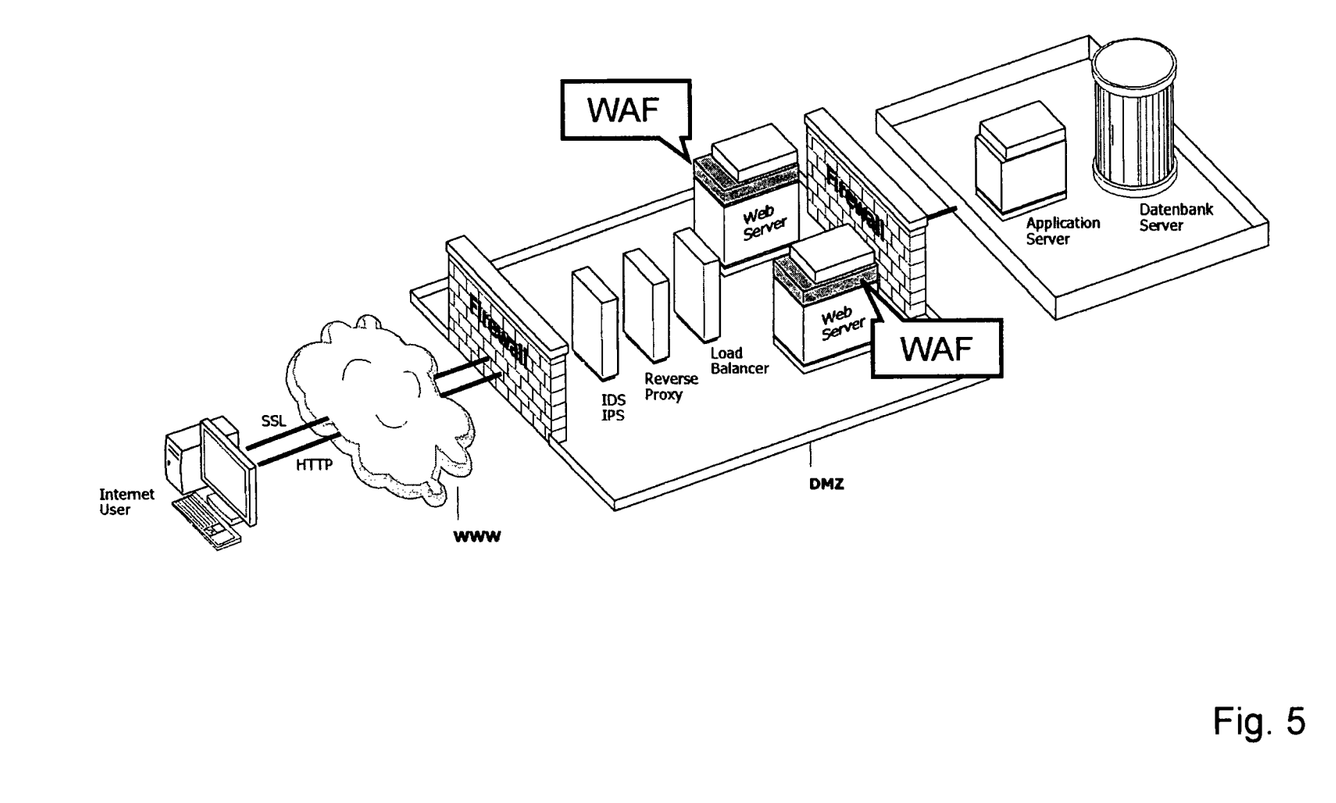

Expert up-to-date knowledge (attack description) 402 is stored on the GIS 401. This knowledge is manually inserted by experts (e.g. by defining new Handlers). This knowledge can be used by the local plugins to detect new attacks 404. In particular this knowledge serves as initial knowledge base for AI based Handlers which need supervised learning.

Learned Knowledge Database (LKD)

When the Artificial Intelligence Engine of a local Plugin 407 learns new results concerning an attack 405, this knowledge is uploaded 409 to the GIS 401. The others plugins—if they protect similar Web applications—can then use this knowledge 408, 409, 410.

Web Application Classification

GIS is capable of deciding which Web application are similar (thanks to similarity measurement and Clustering algorithms). The GIS thus handle as many EKD 402 and LKD 403 as there are Web Application classes. GIS can decide which information is relevant for which local Plugin.

Clustering in GIS

To automatically classify the Web Applications, the GIS 401 use unsupervised classification algorithms, and more specifically an algorithm family called clustering algorithms. Clustering algorithms are often used in the field of Data Mining: this research area aims at discovering knowledge in large amount of data. The use of Data Mining algorithms to analyze or discover knowledge issued form the Web is called Web Mining. Depending on the Web Data one wants to analyze, one distinguishes several kinds of Web Mining: Web Content Mining, Web Usage Mining and Web Structure Mining. For example, Web Usage Mining (WUM) is the application of Data Mining techniques to discover usage patterns from Web data, in order to understand and better serve the needs of Web-based applications. WUM is intended to improve the performances/efficiency of a Web application by better suiting the needs of the customers.

The WUM community proposed several schemes to discover and analyze usage pattern from Web Data. We decided to adapt the most successful methods developed in this area to our purpose: Web Application Security. Thus GIS 100, 200, 302, 401 uses Hierarchical Clustering algorithms to discover classes of Web applications among all the clients connected 103, 203, 303, 407 (but other Clustering algorithms could be envisaged). Thus the Plugin protecting Web applications in a same class can share the same EKD/LKD. The various classes of applications are stored as Web applications profiles 201.

It will also be understood that the system according to the invention may be a suitably programmed computer. Likewise, the invention contemplates a computer program being readable by a computer for executing any of the methods of the invention. The invention further contemplates a machine-readable memory tangibly embodying a program of instructions executable by the machine for executing any of the methods of the invention.

The invention claimed is:

1. A method for protecting web applications, the method comprising:
  at a first web application firewall (WAF):
    receiving a first HTTP request from over a network, the first HTTP request being destined for a first web server that is associated with a first web application that is running on the first web server, the first web application being categorized in a first class;
    analyzing the first HTTP request based on at least one rule applied by a handler;
    generating a second rule based on the analyzing, wherein said generating involves:
      in response to determining that a referrer URL included in the first HTTP request is not present in a whitelist or a blacklist, incrementing a count corresponding to the referrer URL, wherein the count keeps track of HTTP requests that were received within a given time window that included the referrer URL, and
      in response to determining that the count corresponding to the referrer URL is above a threshold, generating the second rule, wherein the second rule redirects HTTP requests that include the referrer URL to a gray list URL; and
    transmitting the second rule, over the network, to a global server unit; and at a second web application firewall (WAF):
    receiving the second rule from over the network from the global server unit;
    receiving a second HTTP request from over a network, the second HTTP request being destined for a second web server that is associated with a second application that is running on the second web server and categorized in the first class; and
    analyzing the second HTTP request based on the second rule, the second rule being communicated from the global server unit to the second WAF responsive to the global server unit identifying the first web application and the second web application as being members of the first class and the second web application running on the second web server.

2. The method of claim 1, further comprising utilizing a network connection between the first WAF and the second WAF to share results concerning an attack that is associated with the receiving the first HTTP request.

3. The method of claim 2, wherein the results concerning the attack are stored in a learned knowledge database that is coupled to the first WAF and wherein the network connection between the first WAF and the second WAF is through the global server unit.

4. The method of claim 3, wherein the results concerning the attack include a plurality of attack descriptions.

5. The method of claim 1, further comprising building a database that is coupled to the global server unit, wherein the database contains a plurality of profiles of a first plurality of web applications that are protected by the first WAF and a second plurality of web applications that are protected by the second WAF.

6. The method of claim 5, wherein the building the database includes utilizing a clustering algorithm to discover the first class, and wherein the clustering algorithm compares the first web application that is being protected by the first WAF with the second web application that is being protect by the second WAF to discover the first class.

7. The method of claim 1, further comprising:
receiving a first HTTP response from over a network from the first web server, the first HTTP response being communicated by the first web server responsive to the first HTTP request; and
analyzing the first HTTP response.

8. The method of claim 7, further comprising:
generating a cookie; and
modifying the first HTTP response to contain the cookie.

9. The method of claim 8, wherein the cookie includes a strong session identifier.

10. A system to protect web applications, the system comprising:
a first web application firewall (WAF) executing on a first processor to receive a first HTTP request from over a network, the first HTTP is destined for a first web server that is associated with a first web application that is to run on the first web server, the first web application is categorized in a first class, the first WAF to analyze the first HTTP request based on at least one rule applied by a handler, generate a second rule based on the analysis, and transmit the second rule, over the network, to a global server unit, wherein said generating involves:
in response to determining that a referrer URL included in the first HTTP request is not present in a whitelist or a blacklist, incrementing a count corresponding to the referrer URL, wherein the count keeps track of HTTP requests that were received within a given time window that included the referrer URL, and
in response to determining that the count corresponding to the referrer URL is above a threshold, generating the second rule, wherein the second rule redirects HTTP requests that include the referrer URL to a graylist URL; and
a second web application firewall (WAF) executing on a second processor to receive the second rule from over the network from the global server unit, receive a second HTTP request from over a network, the second HTTP request is destined for a second web server that is associated with a second application that is to run on the second web server and categorize in the first class, the second WAF to analyze the second HTTP request based on the second rule, the second rule is communicated from the global server unit to the second WAF responsive to an identification by the global serve unit of the first web application and the second web application as members of the first class and the second web application running on the second web server.

11. The system of claim 10, wherein the first WAF and the second WAF utilize a network connection to share results concerning an attack that is associated with the first HTTP request.

12. The system of claim 11, wherein the results concerning the attack are stored in a learned knowledge database that is coupled to the first WAF and wherein the network connection between the first WAF and the second WAF is through the global server unit.

13. The system of claim 12, wherein the results concerning the attack includes a plurality of attack descriptions.

14. The system of claim 13, wherein the database is built with a clustering algorithm to discover the first class, and wherein the clustering algorithm is to compare the first web application that is being protected by the first WAF with the second web application that is being protect by the second WAF to discover the first class.

15. The system of claim 10, further comprising a database that is coupled to the global server unit, wherein the database contains a plurality of profiles of a first plurality of web applications that are protected by the first WAF and a second plurality of web applications that are protected by the second WAF.

16. The system of claim 10, wherein the first WAF is to receive a first HTTP response from over a network from the first web server, the first HTTP response is communicated by the first web server responsive to the first HTTP request and wherein the first WAF is to analyze the first HTTP response.

17. The system of claim 16, wherein the first WAF is to generate a cookie and modify the first HTTP response to contain the cookie.

18. The system of claim 17, wherein the cookie includes a strong session identifier.

19. A computer program comprising computer program code stored on a non-transitory computer readable medium, the computer program code for performing a method protecting web applications, method comprising:
at a first web application firewall (WAF):
receiving a first HTTP request from over a network, the first HTTP request being destined for a first web server that is associated with a first web application that is running on the first web server, the first web application being categorized in a first class;
analyzing the first HTTP request based on at least one rule applied by a handler;
generating a second rule based on the analyzing, wherein said generating involves:
in response to determining that a referrer URL included in the first HTTP request is not present in a whitelist or a blacklist, incrementing a count corresponding to the referrer URL, wherein the count keeps track of HTTP requests that were received within a given time window that included the referrer URL, and
in response to determining that the count corresponding to the referrer URL is above a threshold, generating the second rule, wherein the second rule redirects HTTP requests that include the referrer URL to a graylist URL;

transmitting the second rule, over the network, to a global server unit; and at a second web application firewall (WAF):

receiving the second rule from over the network from the global server unit;

receiving a second HTTP request from over a network, the second HTTP request being destined for a second web server that is associated with a second application that is running on the second web server and categorized in the first class; and analyzing the second HTTP request based on the second rule, the second rule being communicated from the global server unit to the second WAF responsive to the global server unit identifying the first web application and the second web application as being members of the first class and the second web application running on the second web server.

\* \* \* \* \*